United States Patent [19]
Yoshimura

[11] Patent Number: 5,910,393
[45] Date of Patent: *Jun. 8, 1999

[54] OPTICAL RECORDING MATERIAL

[75] Inventor: Motomu Yoshimura, Amagasaki, Japan

[73] Assignee: Mitsubishi Denki Kabushiki Kaisha, Tokyo, Japan

[ * ] Notice: This patent is subject to a terminal disclaimer.

[21] Appl. No.: 08/290,010

[22] Filed: Aug. 12, 1994

Related U.S. Application Data

[63] Continuation of application No. 07/985,369, Dec. 3, 1992, abandoned, which is a continuation of application No. 07/771,521, Oct. 4, 1991, abandoned, which is a continuation of application No. 07/315,793, Oct. 2, 1989, abandoned, and application No. PCT/JP87/00373, Jun. 10, 1987, abandoned.

[30] Foreign Application Priority Data

Jun. 10, 1987 [WO] WIPO ........................ PCT/JP87/00373

[51] Int. Cl.$^6$ ......................................................... G11B 7/24
[52] U.S. Cl. ..................... 430/270.11; 430/945; 365/115; 428/64.8
[58] Field of Search .................................... 430/270, 495, 430/19, 945, 270.11; 346/135.1, 76.2; 428/64, 64.8; 365/119, 115, 106

[56] References Cited

U.S. PATENT DOCUMENTS

| | | |
|---|---|---|
| 4,101,975 | 7/1978 | Castro . |
| 4,101,976 | 7/1978 | Castro et al. . |
| 4,666,810 | 5/1987 | Elmasry . |

(List continued on next page.)

FOREIGN PATENT DOCUMENTS

| | | |
|---|---|---|
| 2492400 | 4/1982 | France . |
| 2716800 | 10/1977 | Germany . |
| 58-187454 | 11/1983 | Japan . |

(List continued on next page.)

OTHER PUBLICATIONS

Patent Abstracts of Japan, vol. 19, No. 14 JP 59–162089 12.9 1984 (Jan. 22, 1985).
Japanese Journal of Applied Physics, vol. 56, pp. 1307–1319, 1987 with English translation of relevant parts pp. 1312–1314.
Motomu Yoshimura, Ultra–High Density Optical Memory by Photo–Chemical Hole Burning, May 1992, pp. 285–295, Electronic Data Communication Society, C–1, vol. J75–C–1, No. 5.
Toshiro Tani and Akira Itani, Excited State Proton Transfer and Persistent Hole Formation Processes in Hydroxyanthraquinone Derivatives, 1992, pp. 247–252, Mol Cryst. Liq. Cryst. vol. 216.
Fessenden et al., Spectroscopy II: Ultraviolet Spectra, Color and Vision, Mass Spectra, Organic Chemistry, 2nd Ed., Willard Grant Press, Boston, Massachusetts, pp. 916–944.
Gutierrez et al., Multiple Photochemical Hole–Burning in Organic Glasses and Polymers: Spectroscopy and Storage Aspects, IBM J. Res. Develop., vol. 26, No. 2 Mar. 1982, pp. 198–208.
Fessenden et al Organic Chemistry 2nd ed., PWS Publisher, Rand McNally and Company, 1982 pp. 916–944.
Japanese Journal of Applied Physics, vol. 56, pp. 1307–1319, 1987.

Primary Examiner—Thorl Chea
Attorney, Agent, or Firm—Wolf, Greenfield & Sacks, P.C.

[57] ABSTRACT

The present invention relates to a recording member having an inherent optical absorption wavelength range and a property of changing optical absorption spectral characteristics before and after the absorption of light to record informations by absorbing a light within the optical absorption wavelength range. In order to shift the wavelength range of this optical absorption spectrum toward longer wavelengths, at least one kind of substituents having a π electron system, an electron donative property or an electron acceptive property is used as a substituent of a molecule constructing the recording member in an optical recording material. Such an optical recording material can be used in memories in the computer system and the like.

5 Claims, 2 Drawing Sheets

U.S. PATENT DOCUMENTS

| | | | |
|---|---|---|---|
| 4,666,819 | 5/1987 | Elmasry | 430/270 |
| 4,702,945 | 10/1987 | Etzbach et al. | 428/1 |
| 4,719,613 | 1/1988 | Hirose et al. | 430/495 |
| 4,962,479 | 10/1990 | Imai et al. | 365/119 |

FOREIGN PATENT DOCUMENTS

| | | | |
|---|---|---|---|
| 59-162089 | 9/1984 | Japan . | |
| 60-255853 | 12/1985 | Japan . | |
| 63-102988 | 10/1986 | Japan . | |
| 61-273987 | 12/1986 | Japan | 428/64 |
| 63-203391 | 2/1987 | Japan . | |
| 63-102988 | 5/1988 | Japan | 428/64 |
| 63-203391 | 8/1988 | Japan | 428/64 |
| 2 193 658 | 2/1988 | United Kingdom . | |
| 2193658 | 2/1988 | United Kingdom | 428/64 |

OPTICAL RECORDING MATERIAL

This application is a file wrapper continuation of application Ser. No. 07/985,369, filed Dec. 3, 1992, now abandoned which is a FWC of Ser. No. 07/771521, filed Oct. 4, 1991, now abandoned which is a FWC of Ser. No. 07/315,793, filed Oct. 2, 1989, now abandoned and a continuation of a PCT application PCT/JP 87/00373 filed Jun. 10, 1987.

SPECIFICATION

1. Field of the Invention

The present invention relates to an optical recording material, in particular to an optical recording material utilizing the photochemical hole burning reaction (hereinafter referred to as the PHB reaction).

2. Prior Art

FIG. 1 is a diagram showing the conventional optical recording device using the optical recording material carrying out the PHB reaction and FIG. 2 is a graph showing a relation between the wavelength and the absorption of the optical recording material. Referring to FIG. 1, reference numeral (1) designates an optical recording material carrying out the PHB reaction and having optical absorption bands at inherent wavelengths of $A_1$ to $A_n$ as shown in FIG. 2. Reference numeral (2) designates a laser beam transmitter and reference numeral (3) designates a laser beam outputted from the laser beam transmitter having a wavelength distribution of the optical absorption band width $A_n$ inherent to the optical recording material (1) or less and a wavelength range within $A_1$ to $A_n$. Reference numeral (4) designates a signal detector.

In operation, upon being incident the laser beam (3) upon the optical recording material (1), of the optical absorption bands at the inherent wavelengths of the optical recording material (1), the optical absorption band within the wavelength range of the incident laser beam (3) is lost. Signals are obtained at an order of wavelength by using the existence of the wavelength of this optical absorption band as a binary code of 0, 1, as shown in FIG. 3.

As a rule, there are about $10^3$ optical absorption bands at the inherent wavelengths of the optical recording material (1) utilizing the PHB reaction. As a result, the optical recording density per unit area $10^3$ times as dense as that in the conventional optical recording method, that is to say, a high density of $10^{11}$ bits/cm$^2$, can be attained.

It is preferable that an absorption band range of an optical recording material utilizing such the PHB reaction coincides with a light emitting band range of a semi-conductor laser. However, a highly efficient optical recording material having an absorption band range coinciding with a semi-conductor laser wavelength range having a relatively long wavelength range has not been found up to now.

DISCLOSURE OF THE INVENTION

The present invention has been achieved in order to solve the above described problem. It is an object of the present invention to provide an optical recording material capable of shifting an optical absorption wavelength range of an optical recording material toward longer wavelengths and bringing about the PHB reaction by a semi-conductor laser beam.

The optical recording material according to the present invention uses at least one kind of substituents having a π electron system, an electron donative property or an electron acceptive property as a substituent of a molecule of a recording member having a property of changing optical absorption spectral characteristics before and after the absorption of light to record informations by having the inherent optical absorption wavelength range and absorbing a light within the absorption wavelength range, whereby shifting the wavelength range of the absorption spectrum of the optical recording member toward longer wavelengths.

Concretely speaking, naphthoquinone dyestuff derivatives, to which quinizarin efficiently bringing about the PHB reaction belongs, are used as a recording medium to shift the optical absorption band range thereof to the transmission range of the semi-conductor laser and used in the optical recording material utilizing the PHB reaction so as to use the semi-conductor laser as a light source for the optical recording.

Thus, the optical absorption band range of the recording medium can be shifted toward longer wavelengths by giving substituents having a structure of increasing a conjugate property of π electron system or those having a property of donating or accepting electrons to a basic structure of for example naphthoquinon type of the dyestuff in the recording medium.

That is to say, the naphthoquinon basic structure consists of an aromatic π electron system. If the π electron system capable of being conjugated with the π electron system in the naphthoquinon basic structure is selected as the substituent, the π electron system in the naphthoquinon basic structure is conjugated with also the π electron system in the substituent to shift the absorption spectrum of the dyestuff toward longer wavelengths. In addition, if the substituent having the property of donating electrons or that of accepting electrons is added, an intermolecular transfer of charge is brought about in a molecule itself of the dyestuff to shift the absorption spectrum of the molecule of the dyestuff toward longer wavelengths.

As above described, the substituents having the π electron system, property of donating electrons and property of accepting electrons show an effect of effectively shifting the absorption spectrum of the molecule of the dyestuff toward longer wavelengths but the effect is synergistic, so that the simultaneous addition of the substituents having the π electron system and those having the property of donating electrons or that of accepting electrons leads to the promotion of the absorption spectrum of the dyestuff toward longer wavelengths.

In addition, in order to concretely bring about the PHB reaction in the dyestuff, the substituents of at least one combination of a combination of $X_1$ and $X_4$ or a combination of $X_5$ and $X_8$ of the substituents having the following molecular structure (I) must contain either a —NH bond or a —OH bond but it is preferable that both two substituents of at least one combination contain at the same time either the —NH bonds or the —OH bonds.

Molecular structure (I)

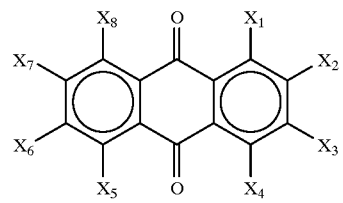

wherein X designates a substituent.

PREFERRED EMBODIMENTS

EXAMPLE 1

Figure 1:
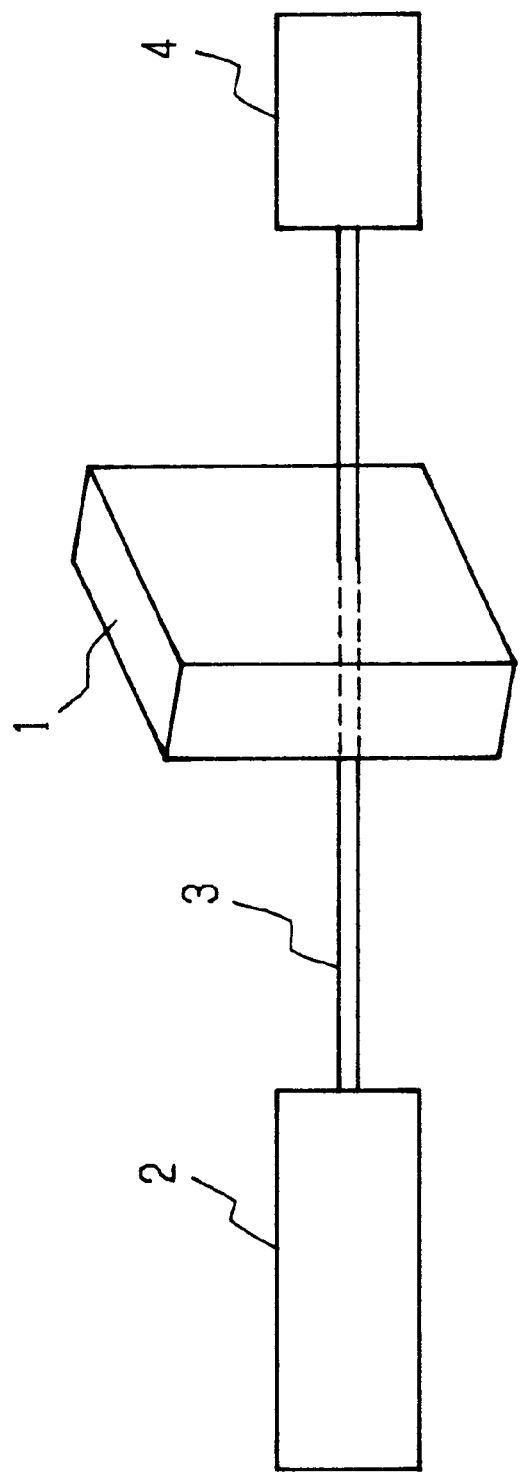
FIG. 1 is a block diagram showing a general optical recording device utilizing an optical recording material of the same kind as that in the present invention.
Figure 2:
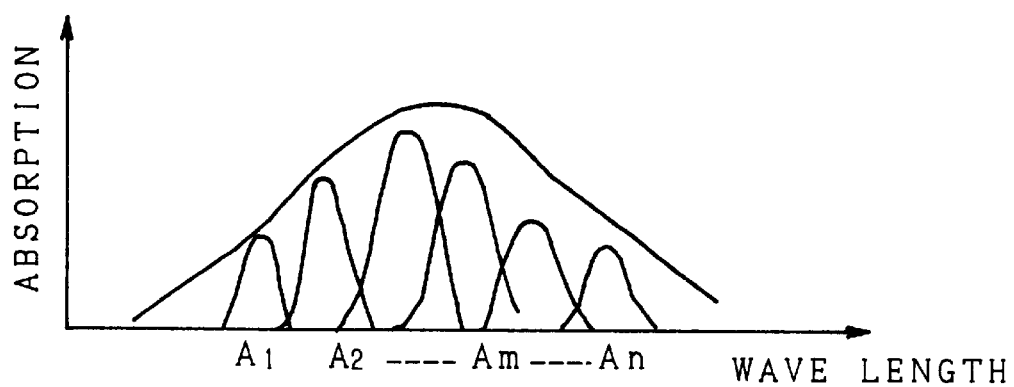
FIG. 2 is a diagram showing optical absorption spectral characteristics of the optical recording material of the same kind as that in the present invention.
Figure 3:
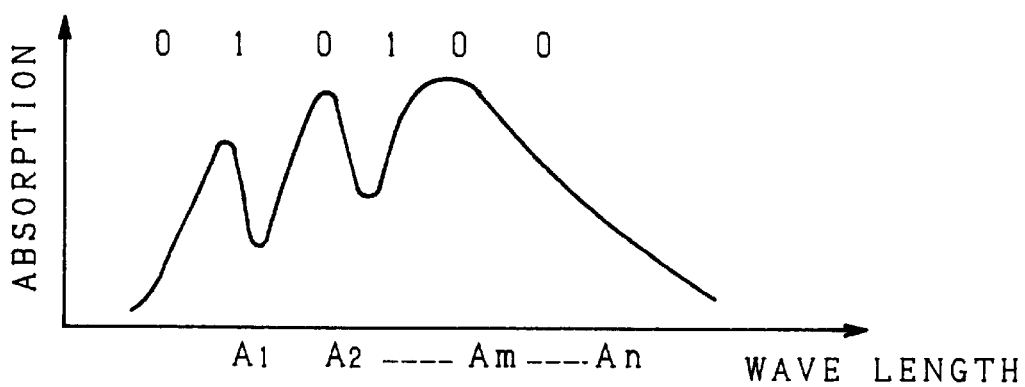
FIG. 3 is a diagram showing optical absorption spectral characteristics after the PHB optical recording by the use of the optical recording material of the same kind as that in the present invention.

A naphthoquinon derivative (N1) obtained by adding a —$NH_2$ group (amino group) having the strong property of donating electrons as the substituents $X_4$, $X_8$ in the molecular structure (I), using a —OH group (hydroxylic group) as the substituents $X_1$, $X_5$ in the molecular structure (I) to give a performance of bringing about the PHB reaction and adding a phenyl derivative group having both the π electron system and an alkyl group (—$CH_3$) and an alkoxy group (—$OC_2H_4OC_6H_{13}$) having the property of donating electrons as the substituent $X_2$ in the molecular structure (I) shows a peak of the optical absorption spectrum shifted toward longer wavelengths until 645 nm or more.

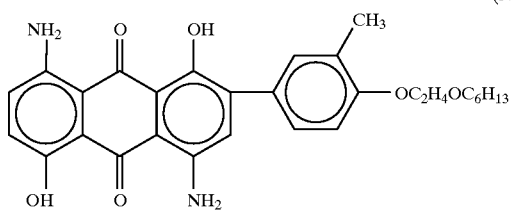
(N1)

In addition, the optical absorption spectrum of quinizarin (conventional) having merely the following structure shows a peak of about 510 nm.

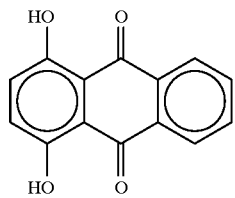

EXAMPLE 2

A naphthoquinon derivative (N2) obtained by adding a —$NH_2$ group having the strong property of donating electrons as the substituents $X_1$, $X_4$ in the molecular structure (I), giving the performance of bringing about the PHB reaction, using a C=O group (carbonyl group) having the strong property of accepting electrons as both the substituents $X_2$, $X_3$ in the molecular structure (I) and bonding two carbonyl groups by an imide bond having the property of donating electrons shows a peak of the optical absorption spectrum shifted toward longer wavelengths until 680 nm or more.

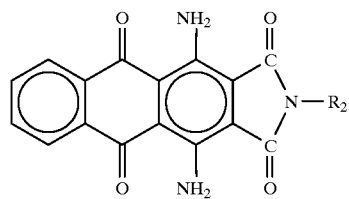
(N2)

($R_2$ is an alkyl group or alkoxy group.)

EXAMPLE 3

A naphthoquinon derivative (N3) obtained by adding a —$NH_2$ group having the strong property of donating electrons as the substituents $X_1$, $X_4$ in the molecular structure (I), giving the performance of bringing about the PHB reaction, using a >C=O group and a >C=S group (thiocarbonyl group) having the strong property of accepting electrons as the substituent $X_2$ and $X_3$, respectively, in the molecular structure (I) and bonding the >C=O group with the >C=S group by a bond similar to the imide bond having the property of donating electrons shows a peak of the optical absorption spectrum shifted toward longer wavelengths until 760 nm or more.

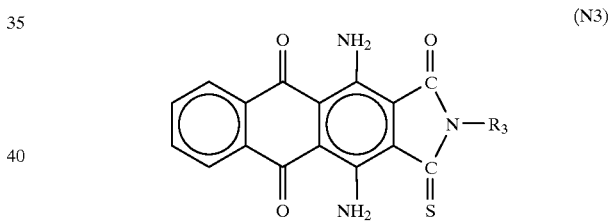
(N3)

($R_3$ is an alkyl group or alkoxy group.)

EXAMPLE 4

A naphthoquinon derivative (N4) obtained by adding a —$NH_2$ group having the strong property of donating electrons as the substituents $X_1$, $X_4$ in the molecular structure (I), giving the performance of bringing about the PHB reaction, using a >C=O group having the strong property of accepting electrons as the substituent $X_2$ in the molecular structure (I), using a substituent having a >C=N— group (group similar to an imino group) capable of being conjugated with a π electron system of a naphthoquinon structure as the substituent $X_3$ in the molecular structure (I) and bonding the >C=O group with the >C=N— group by a bond similar to an imide bond having the property of donating electrons shows a peak of the optical absorption spectrum shifted toward longer wavelengths until 670 nm or more.

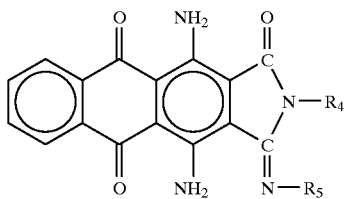

(N4)

(R4, R5 is an alkyl group or alkoxy group.)

EXAMPLE 5

A —NH2 group having the strong electron donative property is added as the substituents $X_1$, $X_4$ in the molecular structure (I) and at least one kind of substituents having a π electron system, an electron donative property or an electron acceptive property is used as a substituent of a molecule of an optical recording member having a property of changing characteristics of bringing about the PHB reaction to record informations to shift the wavelength range of the optical absorption spectrum of the optical recording member toward longer wavelengths, so that the wavelength range of the optical absorption spectrum of the optical recording member can be brought close to a transmission wavelength range of a semi-conductor laser whereby the PHB optical recording material capable of using the semi-conductor laser as a writing laser can be obtained.

INDUSTRIAL UTILITY

The present invention can be used in memories in the computer system and the like.

What is claimed is:

1. An optical recording system, comprising:
    a semiconductor laser capable of emitting electromagnetic radiation having a wavelength of 670 nm or longer;
    a signal detector for detecting the electromagnetic radiation emitted by the semiconductor laser, the signal detector being located in the path of the electromagnetic radiation emitted by the laser a distance from the laser; and
    a recording medium in a form of a layer of a dyestuff capable of absorbing the electromagnetic radiation and subsequently exhibiting a loss of an absorption band at the wavelength of the electromagnetic radiation emitted by the laser, the dyestuff being capable of undergoing a photochemical hole burning reaction and being formed from a molecule selected from the group consisting of:

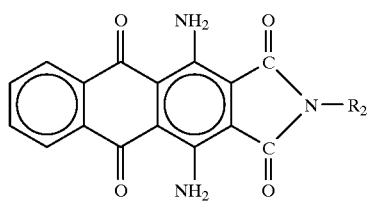

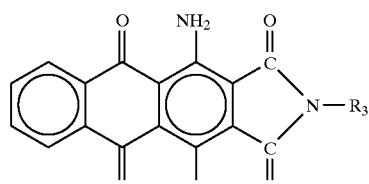

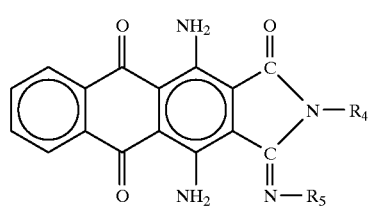

wherein $R_2$, $R_3$, $R_4$, and $R_5$ are each independently selected from the group consisting of alkyl groups and alkoxy groups, the recording medium being supported in the path of the electromagnetic radiation emitted by the laser between the laser and the signal detector so that the electromagnetic radiation emitted by the laser impinges upon the dyestuff prior to impinging upon the signal detector and the loss of the absorption band of the dyestuff is detected by the signal detector, and wherein the dyestuff has an absorption wavelength of 670 nm or longer.

2. The optical recording system according to claim 1, wherein the dye stuff includes:

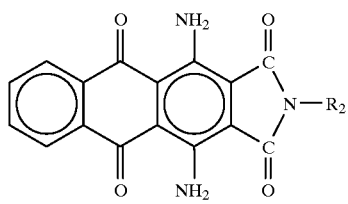

wherein $R_2$ is the same as defined in claim 1 and the wavelength of the laser beam is about 680 nm.

3. The optical recording system according to claim 1, wherein the dye stuff includes:

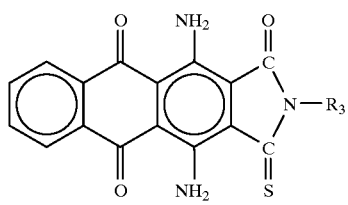

wherein $R_3$ is the same as defined in claim 1 and the wavelength of the laser beam is about 760 nm.

4. The optical recording system according to claim 2, wherein the dye stuff includes:

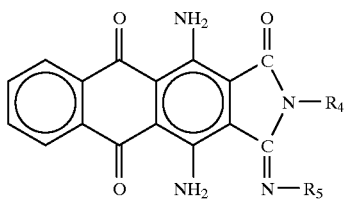

wherein $R_4$ and $R_5$ are as defined in claim 1.

5. An optical recording system, comprising:
a semiconductor laser capable of emitting electromagnetic radiation having a wavelength of 645 nm;
a signal detector for detecting the electromagnetic radiation emitted by the laser, the signal detector being located in the path of the electromagnetic radiation emitted by the laser a distance from the laser; and
a recording medium in a form of a layer of a dyestuff capable of absorbing the electromagnetic radiation emitted by the laser and subsequently exhibiting a loss of an absorption band at the wavelength of the electromagnetic radiation emitted by the laser, the dyestuff being capable of undergoing a photochemical hole burning reaction and being formed from a molecule having a formula:

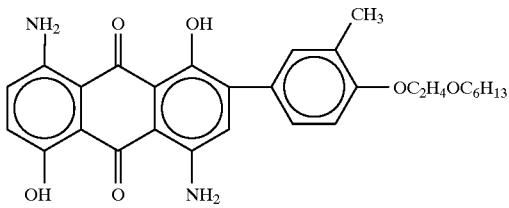

wherein the recording medium is supported in the path of the electromagnetic radiation emitted by the laser between the laser and the signal detector so that the electromagnetic radiation emitted by the laser impinges upon the dyestuff prior to impinging upon the signal detector and the loss of the absorption band of the dyestuff is detected by the signal detector, and wherein the dyestuff has an absorption wavelength of about 645 nm.

* * * * *